United States Patent
Fesler

(10) Patent No.: US 11,990,039 B2
(45) Date of Patent: May 21, 2024

(54) EMERGENCY VEHICLE DETECTION DEVICE

(71) Applicant: James Fesler, Hortense, GA (US)

(72) Inventor: James Fesler, Hortense, GA (US)

( * ) Notice: Subject to any disclaimer, the term of this patent is extended or adjusted under 35 U.S.C. 154(b) by 0 days.

(21) Appl. No.: 17/702,114

(22) Filed: Mar. 23, 2022

(65) Prior Publication Data

US 2023/0306844 A1    Sep. 28, 2023

(51) Int. Cl.
*H04N 5/44*  (2011.01)
*B60W 50/14*  (2020.01)
*G08G 1/0965*  (2006.01)

(52) U.S. Cl.
CPC ........ *G08G 1/0965* (2013.01); *B60W 50/14* (2013.01); *B60W 2050/146* (2013.01)

(58) Field of Classification Search
CPC ............... G08G 1/0965; B60W 50/14; B60W 2050/146
See application file for complete search history.

(56) References Cited

U.S. PATENT DOCUMENTS

| | | | | |
|---|---|---|---|---|
| 3,626,365 A * | 12/1971 | Press | ................ | G01S 3/802 367/909 |
| 3,710,313 A * | 1/1973 | Kimball | ............ | G08G 1/0965 340/904 |
| 4,158,190 A * | 6/1979 | Stefanov | ............ | G08G 1/0965 340/902 |
| 4,212,085 A * | 7/1980 | Vaillancour | ........ | G01S 3/8034 340/902 |
| 4,806,931 A * | 2/1989 | Nelson | ................ | G08G 1/087 367/199 |
| 4,864,297 A * | 9/1989 | Shaw | ................ | G08G 1/087 340/925 |
| 4,952,931 A * | 8/1990 | Serageldin | ........ | G08G 1/0965 340/901 |
| 5,894,279 A * | 4/1999 | Rose | ................ | G08G 1/0965 340/904 |
| 9,248,778 B2 * | 2/2016 | Ford | .................... | B60Q 1/52 |
| 2012/0119900 A1 * | 5/2012 | Walther | ............. | B60Q 1/268 340/474 |
| 2019/0279505 A1 * | 9/2019 | Kawauchi | ......... | G08G 1/0962 |

* cited by examiner

*Primary Examiner* — Munear T Akki
(74) *Attorney, Agent, or Firm* — The Iwashko Law Firm, PLLC; Lev Ivan Gabriel Iwashko

(57) ABSTRACT

An emergency vehicle detection device, including a main body to be removably disposed on at least a portion of an interior of a vehicle, a plurality of microphones removably connected to at least a portion of the vehicle to detect at least one frequency emitted from an emergency vehicle, and a light unit connected to the main body to illuminate based on at least one of a type of the emergency vehicle and a direction of approach of the emergency vehicle.

5 Claims, 1 Drawing Sheet

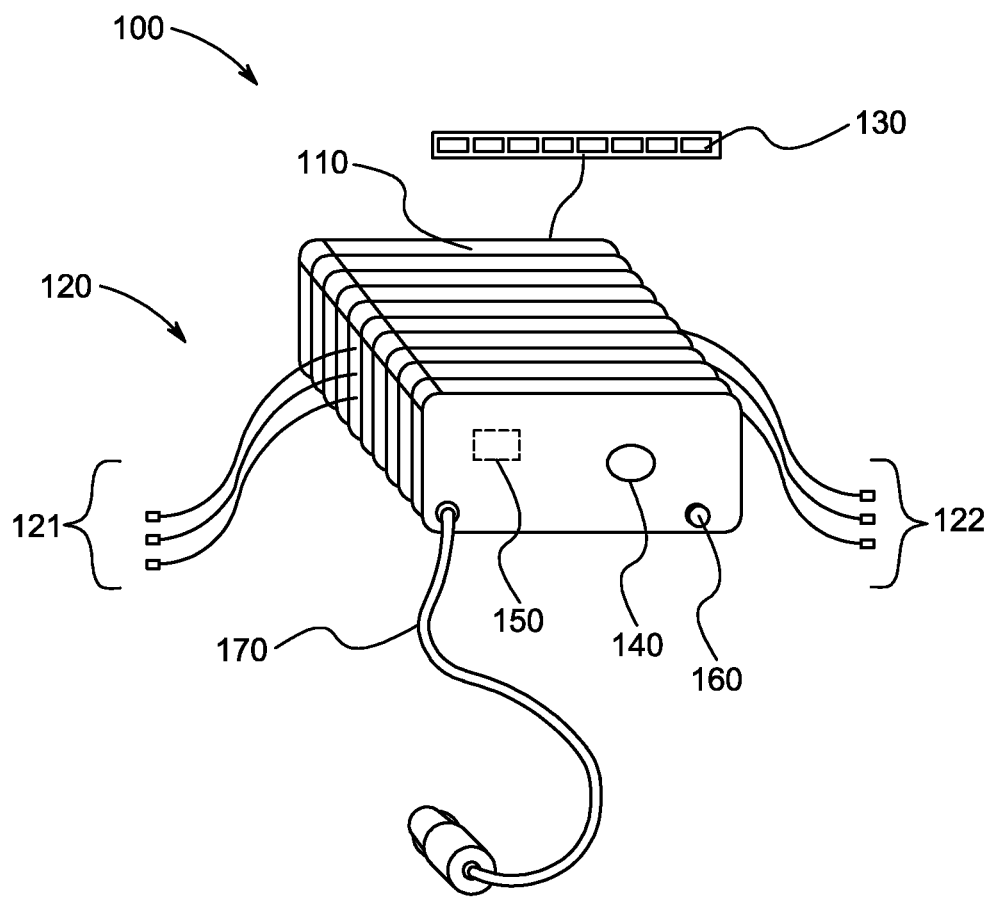

EMERGENCY VEHICLE DETECTION DEVICE

BACKGROUND

1. Field

The present general inventive concept relates generally to emergency vehicle alerts, and particularly, to an emergency vehicle detection device.

2. Description of the Related Art

An emergency vehicle is typically configured with lights and/or sirens to alert other drivers and/or pedestrians of its approach. In particular, the lights and/or the sirens help attract attention so that the other drivers and/or the pedestrians remain vigilant to avoid obstructing the emergency vehicle as they may need to travel at a high speed.

However, most drivers of a vehicle will not know what type of emergency vehicle is approaching until the emergency vehicle is within visible range. In other words, the driver may be alerted by the lights and/or the sirens to avoid the emergency vehicle, but won't know which direction the emergency vehicle is approaching from until the emergency vehicle is already seen by the driver. In some cases, this can be dangerous and/or problematic for the driver and/or any other drivers and/or pedestrians. Also, people who are hearing impaired and/or listen to loud music while driving will not be aware of the emergency vehicle until it is very close.

Therefore, there is a need for an emergency vehicle detection device that alerts the driver of the type of the emergency vehicle and/or the direction of travel.

SUMMARY

The present general inventive concept provides an emergency vehicle detection device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an emergency vehicle detection device, including a main body to be removably disposed on at least a portion of an interior of a vehicle, a plurality of microphones removably connected to at least a portion of the vehicle to detect at least one frequency emitted from an emergency vehicle, and a light unit connected to the main body to illuminate based on at least one of a type of the emergency vehicle and a direction of approach of the emergency vehicle.

The plurality of microphones may include a first set of microphones connected to at least a portion of a front of the vehicle to detect the at least one frequency received on at least one of a front side, a left side, and a right side of the vehicle, and a second set of microphones connected to at least a portion of a rear of the vehicle to detect the at least one frequency received on at least one of a rear side, the left side, and the right side of the vehicle.

The light unit may illuminate at least one of a first color in response to the emergency vehicle being a police car, a second color in response to the emergency vehicle being a fire truck, and a third color in response to the emergency vehicle being an ambulance.

The light unit may sequentially illuminate in a direction to identify the direction of approach of the emergency vehicle.

The light unit may sequentially illuminate at least one of right to left to identify the emergency vehicle is approaching from the right of the vehicle, left to right to identify the emergency vehicle is approaching from the left of the vehicle, each end of the light unit towards a center of the light unit to identify the emergency vehicle is approaching from the front of the vehicle, and from the center of the light unit towards each end of the light unit to identify the emergency vehicle is approaching from the rear of the vehicle.

The emergency vehicle detection device may further include a speaker disposed on at least a portion of the main body to emit at least one sound output that identifies at least one of the type of the emergency vehicle and the direction of approach of the emergency vehicle.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a side perspective view of an emergency vehicle detection device, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the FIGURES, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including,"

when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Emergency Vehicle Detection Device 100
Main Body 110
Microphones 120
First Set of Microphones 121
Second Set of Microphones 122
Light Unit 130
Speaker 140
Processing Unit 150
Power Button 160
Power Source 170

FIG. 1 illustrates a side perspective view of an emergency vehicle detection device 100, according to an exemplary embodiment of the present general inventive concept.

The emergency vehicle detection device 100 may be constructed from at least one of metal, plastic, wood, glass, and rubber, etc., but is not limited thereto.

The emergency vehicle detection device 100 may include a main body 110, a plurality of microphones 120, a light unit 130, a speaker 140, a processing unit 150, a power button 160, and a power source 170, but is not limited thereto.

Referring to FIG. 1, the main body 110 is illustrated to have a rounded rectangular prism shape. However, the main body 110 may be rectangular, circular, cylindrical, triangular, pentagonal, hexagonal, heptagonal, octagonal, or any other shape known to one of ordinary skill in the art, but is not limited thereto.

The main body 110 may be removably disposed on at least a portion of an interior of a vehicle. For example, the main body 110 may be disposed on a dashboard, a glovebox, a cup holder, a center console, etc. In other words, the main body 110 may be disposed at any location as desired by a user.

The plurality of microphones 120 may include a first set of microphones 121 (e.g., three microphones or any other number) and a second set of microphones 122 (e.g., three microphones or any other number), but is not limited thereto.

The first set of microphones 121 may be removably connected to at least a portion of a front of the vehicle (e.g., a front windshield, the dashboard, the center console, etc.). Each of the first set of microphones 121 may record at least one first sound thereon. In other words, the first set of microphones 121 may detect the at least one first sound received on a front side, a left side, and/or a right side of the vehicle outside of the vehicle. Also, the first set of microphones 121 may be configured to detect at least one first frequency emitted from the emergency vehicle.

The second set of microphones 122 may be removably connected to at least a portion of a rear of the vehicle (e.g., a rear windshield, a trunk, a rear seat, etc.). Each of the second set of microphones 122 may record at least one second sound thereon. In other words, the second set of microphones 122 may detect the at least one second sound received on a rear side, the left side, and/or the right side of the vehicle outside of the vehicle. Also, the second set of microphones 122 may be configured to detect at least one second frequency emitted from the emergency vehicle.

The light unit 130 may include a light strip, a plurality of lights, a small matrix of lights, and a communication unit (e.g., a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet), but is not limited thereto.

Alternatively, the communication unit of the light unit 130 may be a separate component disposed on another portion of the vehicle of the user, such as a roof of the vehicle.

The light unit 130 may be connected to at least a portion of the main body 110. Alternatively, the light unit 130 may be disposed directly on a surface of the main body 110. The light unit 130 may illuminate based on a type of emergency vehicle and/or a direction of approach of the emergency vehicle as detected by the plurality of microphones 120. For example, the light unit 130 may illuminate a first color (e.g., blue) in response to the emergency vehicle being a police car, a second color (e.g., red) in response to the emergency vehicle being a fire truck, and/or a third color (e.g., white) in response to the emergency vehicle being an ambulance.

Additionally, the light unit 130 may sequentially illuminate in a direction to identify the direction of approach of the emergency vehicle. For example, the light unit 130 may sequentially illuminate right to left to identify the emergency vehicle is approaching from the right of the vehicle of the user, sequentially illuminate left to right to identify the emergency vehicle is approaching from the left of the vehicle of the user, sequentially illuminate each end of the light unit 130 towards a center of the light unit 130 to identify the emergency vehicle is approaching from the front of the vehicle of the user, and/or sequentially illuminate from the center of the light unit 130 towards each end of the light unit 130 to identify the emergency vehicle is approaching from the rear of the vehicle of the user.

The speaker 140 may be disposed on at least a portion of the main body 110. The speaker 140 may emit at least one output sound therefrom. More specifically, the speaker 140 may emit the direction of approach of the emergency vehicle and/or the type of the emergency vehicle (e.g., police car, fire truck, ambulance). For example, the speaker 140 may emit a first word (e.g., right) in response to the emergency vehicle arriving from the right side of the vehicle of the user, emit a second word (e.g., left) in response to the emergency vehicle arriving from the left side of the vehicle of the user, emit a third word (e.g., front) in response to the emergency vehicle arriving from the front side of the vehicle of the user, and/or emit a fourth word (e.g., rear) in response to the emergency vehicle arriving from the rear side of the vehicle of the user.

Also, the speaker 140 may emit the at least one output sound simultaneously with illumination of the light unit 130.

Alternatively, the speaker 140 may emit the at least one output sound prior to or after the illumination of the light unit 130.

The processing unit 150 (or central processing unit, CPU) may include electronic circuitry to carry out instructions of a computer program by performing basic arithmetic, logical, control and input/output (I/O) operations specified by the instructions. The processing unit 150 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 150 may also include a microprocessor and a microcontroller. Also, the processing unit 150 may include a communication unit similar to the communication unit in the light unit 130 described above.

The processing unit 150 may be disposed within at least a portion of the main body 110 and/or connected to the plurality of microphones 120, the light unit 130, and/or the speaker 140. The processing unit 150 may have a program (e.g., an app) running thereon to identify the at least one first sound received from the first set of microphones 121 and/or the at least one second sound received from the second set of microphones 122. Moreover, the processing unit 150 may determine the type of the emergency vehicle and/or the direction of approach of the emergency vehicle based on the at least one first sound and/or the at least one second sound, such that the processing unit 150 recognizes a particular sound of the emergency vehicle and differentiates between the type of the emergency vehicle using the app. Furthermore, the processing unit 150 may determine the type of the emergency vehicle and/or the direction of approach of the emergency vehicle based on the at least one first frequency and/or the at least one second frequency emitted from the emergency vehicle. Thus, the processing unit 150 may send an appropriate response to the light unit 130 and/or the speaker 140 that identifies the type of emergency vehicle and/or the direction of approach of the emergency vehicle.

Furthermore, the processing unit 150 may be controlled via an external computing device, such as a mobile device, a cell phone, a laptop computer, a tablet computer, a desktop computer, a personal digital assistant (PDA), a terminal, a mainframe, and/or any other type of computing device. Additionally, the external computing device may have the app running thereon as described above with respect to the processing unit 150. Also, the external computing device may execute the app to run online services and/or a website to control the plurality of microphones 120, the light unit 130, the speaker 140, and/or the processing unit 150 using the app.

The power button 160 may be disposed on at least a portion of the main body 110. The power button 160 may turn on the plurality of microphones 120, the light unit 130, the speaker 140, and/or the processing unit 150 in response to depressing the power button 160 a first time. Conversely, the power button 160 may turn off the plurality of microphones 120, the light unit 130, the speaker 140, and/or the processing unit 150 in response to depressing the power button 160 a second time.

The power source 170 may include a power inlet (e.g., a universal serial bus connector, a cigarette lighter connector), a battery, and a solar cell, but is not limited thereto.

The power source 170 may be disposed within at least a portion of the main body 110. The power source 170 may provide power to the plurality of microphones 120, the light unit 130, the speaker 140, the processing unit 150, and/or the power button 160.

Therefore, the emergency vehicle detection device 100 may alert the user of the direction of approach of the emergency vehicle and/or the type of the emergency vehicle. Also, the emergency vehicle detection device 100 may assist the user to move the vehicle of the user based on the direction of the approach of the emergency vehicle.

The present general inventive concept may include an emergency vehicle detection device 100, including a main body 110 to be removably disposed on at least a portion of an interior of a vehicle, a plurality of microphones 120 removably connected to at least a portion of the vehicle to detect at least one frequency emitted from an emergency vehicle, and a light unit 130 connected to the main body 110 to illuminate based on at least one of a type of the emergency vehicle and a direction of approach of the emergency vehicle.

The plurality of microphones 120 may include a first set of microphones 121 connected to at least a portion of a front of the vehicle to detect the at least one frequency received on at least one of a front side, a left side, and a right side of the vehicle, and a second set of microphones 122 connected to at least a portion of a rear of the vehicle to detect the at least one frequency received on at least one of a rear side, the left side, and the right side of the vehicle.

The light unit 130 may illuminate at least one of a first color in response to the emergency vehicle being a police car, a second color in response to the emergency vehicle being a fire truck, and a third color in response to the emergency vehicle being an ambulance.

The light unit 130 may sequentially illuminate in a direction to identify the direction of approach of the emergency vehicle.

The light unit 130 may sequentially illuminate at least one of right to left to identify the emergency vehicle is approaching from the right of the vehicle, left to right to identify the emergency vehicle is approaching from the left of the vehicle, each end of the light unit towards a center of the light unit to identify the emergency vehicle is approaching from the front of the vehicle, and from the center of the light unit towards each end of the light unit to identify the emergency vehicle is approaching from the rear of the vehicle.

The emergency vehicle detection device 100 may further include a speaker 140 disposed on at least a portion of the main body 110 to emit at least one sound output that identifies at least one of the type of the emergency vehicle and the direction of approach of the emergency vehicle.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An emergency vehicle detection device, comprising:
a main body to be removably disposed on at least a portion of an interior of a vehicle;
a plurality of microphones removably connected to at least a portion of the vehicle to detect at least one frequency emitted from an emergency vehicle; and
a light strip comprising a small matrix of lights connected to the main body to illuminate based on at least one of a type of the emergency vehicle and a direction of approach of the emergency vehicle, such that the light strip sequentially illuminates based on the direction of approach of the emergency vehicle, such that the small matrix of lights is provided in a linear row and comprises at least three lights, wherein the light strip sequentially illuminates sequentially right to left to identify the emergency vehicle is approaching from the right of the vehicle, sequentially left to right to identify the emergency vehicle is approaching from the left of the vehicle, each end of the light unit towards a center of the light unit to identify the emergency vehicle is approaching from the front of the vehicle, and from the center of the light unit towards each end of the light unit to identify the emergency vehicle is approaching from the rear of the vehicle.

2. The emergency vehicle detection device of claim 1, wherein the plurality of microphones comprises:

a first set of microphones connected to at least a portion of a front of the vehicle to detect the at least one frequency received on at least one of a front side, a left side, and a right side of the vehicle; and a second set of microphones connected to at least a portion of a rear of the vehicle to detect the at least one frequency received on at least one of a rear side, the left side, and the right side of the vehicle.

3. The emergency vehicle detection device of claim 1, wherein the light strip illuminates at least one of a first color in response to the emergency vehicle being a police car, a second color in response to the emergency vehicle being a fire truck, and a third color in response to the emergency vehicle being an ambulance.

4. The emergency vehicle detection device of claim 1, wherein the light strip sequentially illuminates in a direction to identify the direction of approach of the emergency vehicle.

5. The emergency vehicle detection device of claim 1, further comprising:

a speaker disposed on at least a portion of the main body to emit at least one sound output that identifies at least one of the type of the emergency vehicle and the direction of approach of the emergency vehicle.

\* \* \* \* \*